(12) United States Patent
Kim et al.

(10) Patent No.: US 9,507,559 B2
(45) Date of Patent: Nov. 29, 2016

(54) AUDIO OUTPUTTING APPARATUS, CONTROL METHOD THEREOF AND AUDIO OUTPUTTING SYSTEM

(71) Applicant: SAMSUNG ELECTRONICS CO., LTD., Suwon-si (KR)

(72) Inventors: Sung-yong Kim, Yongin-si (KR); Han-ki Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 14/502,559

(22) Filed: Sep. 30, 2014

(65) Prior Publication Data

US 2015/0249890 A1    Sep. 3, 2015

(30) Foreign Application Priority Data

Feb. 28, 2014    (KR) .......................... 10-2014-0024084

(51) Int. Cl.
*H04S 3/00* (2006.01)
*G06F 3/16* (2006.01)

(52) U.S. Cl.
CPC .................. *G06F 3/165* (2013.01); *H04S 3/00* (2013.01)

(58) Field of Classification Search
None
See application file for complete search history.

(56) References Cited

U.S. PATENT DOCUMENTS

| | | | | |
|---|---|---|---|---|
| 5,487,102 | A * | 1/1996 | Rothschild | H04M 1/60 379/223 |
| 7,312,391 | B2 * | 12/2007 | Kaiser | G06F 17/30029 707/999.003 |
| 8,457,334 | B2 | 6/2013 | Yoon et al. | |
| 8,767,996 | B1 * | 7/2014 | Lin | H04R 1/1091 381/370 |
| 2003/0120367 | A1 * | 6/2003 | Chang | G05B 23/0235 700/94 |
| 2003/0160862 | A1 * | 8/2003 | Charlier | H04N 5/23238 348/14.08 |
| 2006/0205349 | A1 | 9/2006 | Passier et al. | |
| 2012/0284619 | A1 * | 11/2012 | Myllyla | H04R 29/008 715/716 |
| 2014/0334653 | A1 * | 11/2014 | Luna | G05B 15/02 381/332 |
| 2015/0063598 | A1 * | 3/2015 | Shah | G08B 3/10 381/105 |
| 2015/0195663 | A1 * | 7/2015 | Lin | H04R 1/1091 381/58 |
| 2015/0249890 | A1 * | 9/2015 | Kim | G06F 3/165 381/80 |

FOREIGN PATENT DOCUMENTS

| | | | |
|---|---|---|---|
| KR | 10-2007-0112838 A | 11/2007 | |
| KR | 10-2011-0072650 A | 6/2011 | |

* cited by examiner

*Primary Examiner* — Peter Vincent Agustin
(74) *Attorney, Agent, or Firm* — Sughrue Mion, PLLC

(57) ABSTRACT

An audio outputting apparatus, controlling method thereof, and audio outputting system are provided. The controlling method of an audio outputting apparatus that outputs multi channel audio with at least one other audio outputting apparatus includes: receiving profile information representing audio characteristics from the at least one other audio outputting apparatus; determining whether or not the received profile information is the same as pre-stored profile information of the audio outputting apparatus; and in response to the received profile information being different from the pre-stored profile information, re-configuring the pre-stored profile information based on the received profile information according to pre-set conditions.

21 Claims, 8 Drawing Sheets

AUDIO OUTPUTTING APPARATUS, CONTROL METHOD THEREOF AND AUDIO OUTPUTTING SYSTEM

CROSS-REFERENCE TO RELATED APPLICATIONS

This application claims priority from Korean Patent Application No. 10-2014-0024084 filed in the Korean Intellectual Property Office on Feb. 28, 2014, the disclosure of which is incorporated herein by reference.

BACKGROUND

1. Field

Methods and apparatuses consistent with the exemplary embodiments relate to an audio outputting apparatus, control method thereof and audio outputting system, and more particularly, to an audio outputting apparatus that outputs multi channel audio in an interlocked manner with at least one other audio outputting apparatus, a control method and audio outputting system thereof.

2. Description of the Prior Art

In general, in order to configure multi channels through a plurality of audio outputting apparatuses having different audio characteristics and output audio, the user himself/herself has to set an audio output value for each of the audio outputting apparatuses considering the audio characteristics of the audio outputting apparatuses.

If the user sets each audio outputting apparatus to multi channels without recognizing the audio characteristics of each audio outputting apparatus, an audio outputting apparatus having audio characteristics not suitable to the characteristics of each channel may be set to the channel.

That is, a conventional audio outputting apparatus is not capable of modifying the audio characteristics adaptively considering the audio characteristics of another audio outputting apparatus having different audio characteristics. Therefore, a conventional audio outputting apparatus cannot automatically configure multi channels through an interlocked operation with another audio outputting apparatus having audio characteristics different from the audio outputting apparatus and output multi channel audio.

SUMMARY

A non-limiting purpose of the exemplary embodiments is to provide an audio outputting apparatus that is capable of changing its audio characteristics to adaptively form multi channels with surrounding outputting apparatuses considering the audio characteristics of each of the audio outputting apparatuses having different audio characteristics, a control method thereof, and audio outputting system.

According to an exemplary embodiment of the present disclosure, there is provided a controlling method of an audio outputting apparatus that outputs multi channel audio with at least one other audio outputting apparatus, the method including receiving profile information representing audio characteristics from the at least one other audio outputting apparatus; determining whether or not the received profile information is the same as pre-stored profile information of the audio outputting apparatus; and in response to the received profile information being different from the pre-stored profile information, re-configuring the pre-stored profile information based on the received profile information according to pre-set conditions.

The audio outputting apparatus may exist on a same network as the at least one other audio outputting apparatus, and transmit the pre-stored profile information to the at least one other audio outputting apparatus existing on the same network.

The re-configuring, in response to the received profile information being different from the pre-stored profile information, may include comparing the received profile information with the pre-stored profile information, and in response to an audio set value included in the received profile information being greater than an audio set value included in the pre-stored profile information, re-configure the pre-stored profile information based on the received profile information.

The profile information may include at least one of audio outputting information, frequency characteristics information, volume curve, and Sound Pressure Level (SPL) information.

The re-configuring may include, in response to the received profile information being set as a reference profile information, modifying a volume curve included in the profile information of the audio outputting apparatus based on audio outputting information included in the reference profile information.

The audio outputting information may include an audio outputting power per volume level, and the modifying may comprise adjusting an audio outputting power of a maximum volume level based on an audio outputting power of a volume level corresponding to the maximum volume level included in audio outputting information of the audio outputting apparatus of volume levels included in audio outputting information of the reference profile information, and modify the volume curve.

The re-configuring may further include expanding an audio outputting power of the audio outputting apparatus to an audio outputting power included in the audio outputting information of the reference profile information using a pre-defined output expanding algorithm so as to re-adjust the modified volume curve.

The method may further include, in response to it being impossible to output audio related to a specific frequency area based on frequency characteristics information included in profile information of the audio outputting apparatus and the re-adjusted volume curve, transmitting frequency information on the specific frequency area to another audio outputting apparatus that is capable of outputting audio of the specific frequency area.

The method may further include, in response to receiving a user's channel setting command from a user terminal apparatus, setting an audio outputting channel according the channel setting command.

According to another exemplary embodiment of the present disclosure, there is provided an audio outputting apparatus that outputs multi channel audio with at least one other audio outputting apparatus, the apparatus including a communicator configured to perform communication with the at least one other audio outputting apparatus; a determiner configured to determine whether or not the received profile information is a same as pre-stored profile information of the audio outputting apparatus in response to receiving profile information representing audio characteristics from the at least one other audio outputting apparatus, and a controller configured to re-configure the pre-stored profile information based on the received profile information according to pre-set conditions, in response to the received profile information being different from the pre-stored profile information.

The communicator may transmit the pre-stored profile information to the at least one other audio outputting apparatus existing on a same network as the audio outputting apparatus.

The controller, in response to the received profile information being different from the pre-stored profile information, may compare the received profile information with the pre-stored profile information, and in response to an audio set value included in the received profile information being greater than an audio set value included in the pre-stored profile information, re-configure the pre-stored profile information based on the received profile information.

The apparatus may further include a storage that stores the pre-stored profile information, wherein the pre-stored profile information may include at least one of audio outputting information, frequency characteristics information, volume curve, and Sound Pressure Level (SPL) information.

The controller, in response to the received profile information being set as a reference profile information, may modify a volume curve included in the profile information of the audio outputting apparatus based on audio outputting information included in the reference profile information.

The audio outputting information may include an audio outputting power per volume level, and the controller may adjust an audio outputting power of a maximum volume level based on an audio outputting power of a volume level corresponding to the maximum volume level included in audio outputting information related to the audio outputting apparatus, the volume level being from among volume levels included in audio outputting information of the reference profile information, and modify the volume curve.

The controller may expand an audio outputting power of the audio outputting apparatus to an audio outputting power included in audio outputting information of the reference profile information using a pre-defined output expanding algorithm so as to re-adjust the modified volume curve.

The controller, in response to it being impossible to output audio related to a specific frequency area based on frequency characteristics information included in the pre-stored profile information of the audio outputting apparatus and the re-adjusted volume curve, may control the communicator to transmit frequency information on the specific frequency area to another audio outputting apparatus that is capable of outputting audio of the specific frequency area.

The controller, in response to receiving a user's channel setting command from a user terminal apparatus through the communicator, may set an audio outputting channel according the channel setting command.

According to another exemplary embodiment of the present disclosure, there is provided an audio outputting system that outputs multi channel audio through a plurality of audio outputting apparatuses, wherein one of the plurality of audio outputting apparatuses, in response to receiving profile information from another one of the plurality of audio outputting apparatuses, compares the received profile information with the pre-stored profile information, and in response to the profile information from the another one of the plurality of audio outputting apparatuses and the pre-stored profile information being different from each other, re-configures the pre-stored profile information based on the received profile information according to whether or not the profile information corresponding to pre-set conditions is the received profile information One of the plurality of audio outputting apparatuses, in response to profile information corresponding to the pre-set conditions being the received profile information, may set the received profile information as a reference profile information, and modify a volume curve included in the pre-stored profile information based on audio outputting information included in the reference profile information.

According to another aspect of an exemplary embodiment, in response to receiving a user's channel setting command, one of the audio outputting apparatus and the at least one other audio outputting apparatus is set as a master terminal apparatus.

Said one of the plurality of audio outputting apparatuses may expand an audio outputting power included in audio outputting information of the pre-stored profile information to an audio outputting power included in audio outputting information of the reference profile information using a pre-defined output expanding algorithm so as to re-adjust the modified volume curve.

According to the aforementioned various exemplary embodiments, each of a plurality of audio outputting apparatuses having different audio characteristics may modify the audio characteristics adaptively considering the audio characteristics of another audio outputting apparatus having different audio characteristics and form a multi channel with nearby audio outputting apparatuses.

BRIEF DESCRIPTION OF THE DRAWINGS

The above and/or other aspects of the present disclosure will be more apparent by describing certain present disclosure with reference to the accompanying drawings, in which.

DETAILED DESCRIPTION

Figure 1:
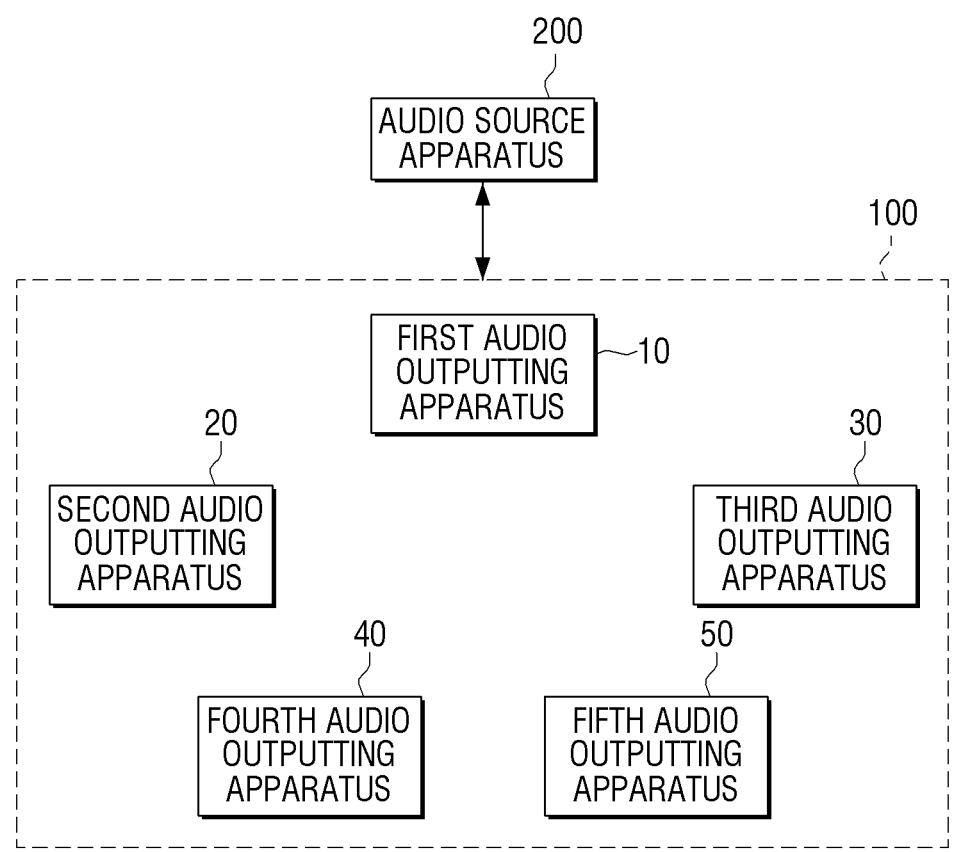
FIG. 1 is a view of an audio outputting system that outputs multi channel audio according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a view of an audio outputting system that outputs multi channel audio according to an exemplary embodiment.

As illustrated in FIG. 1, the audio outputting system includes an audio outputting apparatuses 100 and audio source apparatus 200. Such an audio outputting apparatuses 100 is a terminal apparatus that is capable of outputting audio such as a speaker, and the audio outputting apparatuses 100 may be embodied as a first to fifth audio outputting apparatuses 10~50 as illustrated. These first to fifth audio outputting apparatuses 10~50 may exist on a same network, but may be disposed at different areas and may be set with different audio outputting channels according to a user's channel setting command.

The audio source apparatus 200 is a terminal apparatus that transmits to the first to fifth audio outputting apparatuses 10~50 that output multi channel audio an audio signal corresponding to an audio outputting channel set to each of the first to fifth audio outputting apparatuses 10~50, respectively. Such an audio source apparatus 200 may be a display apparatus such as a set top box, home theater, smart TV, and smart phone.

According to an exemplary embodiment, the first audio outputting apparatus 10 may be set to a center outputting channel, and the second and third audio outputting channel 20, 30 may be set to a left and right front outputting channel, and the fourth and fifth audio outputting apparatus 40, 50 may be set to a left and right rear outputting channel. That is, the first audio outputting apparatus 10 may receive from the audio source apparatus 200 an audio signal that has been signal-processed to an audio signal corresponding to the center outputting channel, and output the received audio signal. Furthermore, the second and third audio outputting apparatus 20, 30 may receive from the audio source apparatus 200 an audio signal that has been signal-processed to an audio signal corresponding to a left and right front outputting channel, respectively, and output the received audio signal. Furthermore, the fourth and fifth audio outputting apparatus 40, 50 may receive from the audio source apparatus 200 an audio signal that has been signal-processed to a signal corresponding to a left and right rear outputting channel, respectively, and output the received audio signal.

As such, the first to fifth audio outputting apparatus 10~50 may output multi channel audio by receiving from the audio source apparatus 200 an audio signal that has been signal-processed to a signal corresponding to each audio outputting channel, respectively, and by outputting the received audio signal.

Meanwhile, the first to fifth audio outputting apparatus 10~50 outputting multi channel audio based on a pre-set audio outputting channel may be a heterogeneous terminal apparatus having difference audio characteristics. Therefore, the first to fifth audio outputting apparatus 10~50 may re-configure their profile information based on profile information representing audio characteristics pre-stored for each audio outputting apparatus and profile information representing audio characteristics of other nearby audio outputting apparatuses, and output multi channel audio with the other nearby audio outputting apparatuses. Although first to fifth audio outputting apparatuses 10~50 are described above, the number of audio outputting apparatuses are not limited to five (5), and may be a lower or higher number.

Hereinbelow is detailed explanation on operations of re-configuring profile information of each of the plurality of audio outputting apparatuses 100 and outputting multi channel audio in an audio outputting system according to an exemplary embodiment.

Figure 2:
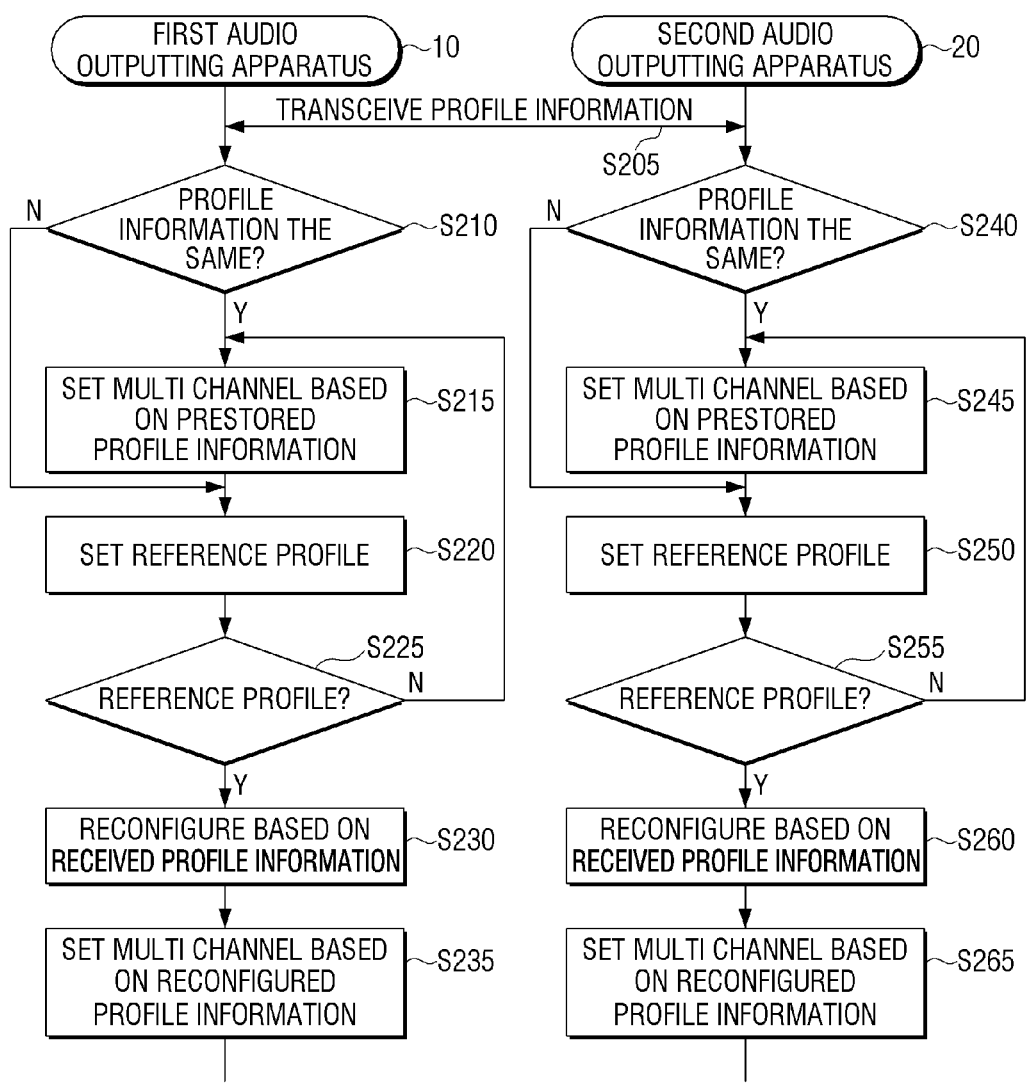
FIG. 2 is a first procedure view for outputting multi channel audio between a plurality of audio outputting apparatuses in an audio outputting system according to an embodiment.

FIG. 2 is a first procedure view for outputting multi channel audio between a plurality of audio outputting apparatuses in an audio outputting system according to an exemplary embodiment.

As illustrated in FIG. 2, a first and second audio outputting apparatus 10, 20 existing on a same network may be pre-set to an audio outputting channel corresponding to a user's channel setting command. In response to being set to each audio outputting channel, the first and second audio outputting apparatus 10, 20 transceive pre-stored profile information (S205). Herein, profile information is information representing audio characteristics related to audio outputting of each of the first and second audio outputting apparatus 10, 20, and the profile information may include at least one of audio outputting information, frequency characteristics information, volume curve, and Sound Pressure Level (SPL) information.

In response to receiving profile information representing audio characteristics of the second audio outputting apparatus 20 from the second audio outputting apparatus 20, the first audio outputting apparatus 10 determines whether or not the received profile information is identical to pre-stored profile information (S210). According to an exemplary embodiment, the first audio outputting apparatus 10 may determine whether or not audio outputting information and sound pressure information included in the received profile information is identical to audio outputting information and sound pressure information included in the pre-stored profile information.

In response to it being determined that the received profile information and the pre-stored profile information are identical to each other, the first audio outputting apparatus 10 determines that it has same audio characteristics as the second audio outputting apparatus 20. As such, in response to it being determined that it has the same audio characteristics as the second audio outputting apparatus 20, the first audio outputting apparatus 10 sets a multi channel for outputting multi channel audio along with the second audio outputting apparatus 20 based on the pre-stored profile information (S215). Accordingly, in response to receiving an audio signal that has been signal-processed to a signal corresponding to a pre-set audio outputting channel from the audio source apparatus 200, the first audio outputting apparatus 10 may output audio corresponding to the corresponding audio outputting channel based on the pre-stored profile information.

Meanwhile, in response to it being determined that the received profile information is different from the pre-stored profile information, the first audio outputting apparatus 10 sets one of the profile information received and the pre-stored profile information as reference profile information based on pre-set conditions (S220). According to an exemplary embodiment, the first audio outputting apparatus 10 may compare audio outputting information or sound pressure information included in the received profile information with the audio outputting information or sound pressure information included in the pre-stored profile information, and set the profile information having a higher outputting intensity or higher sound pressure level as the reference profile information.

In response to the profile information of the first audio outputting apparatus 10 being set as the reference profile information through such a comparison, the first audio outputting apparatus 10 sets a multi channel for outputting multi channel audio along with the second audio outputting apparatus 20 based on the pre-stored profile information. Then, in response to receiving an audio signal that has been signal-processed to a signal corresponding to the pre-set audio outputting channel from the audio source apparatus 200, the first audio outputting apparatus 10 may output audio corresponding to the corresponding audio outputting channel based on the pre-stored profile information.

Meanwhile, in response to the received profile information of the second audio outputting apparatus 20 being set as the reference profile information, the first audio outputting apparatus 10 re-configures the pre-stored profile information of the first audio outputting apparatus 10 based on the received reference profile information (S230). That is, the first audio outputting apparatus 10 may re-configure the pre-stored profile information to the profile information having audio characteristics similar to the audio characteristics of the second audio outputting apparatus 20 based on the reference profile information. As such, in response to the pre-stored profile information being re-configured based on the reference profile information, the first audio outputting apparatus 10 sets a multi channel for outputting multi channel audio along with the second audio outputting apparatus 20 based on the re-configured profile information (S235). Then, in response to receiving an audio signal that has been signal-processed to a signal corresponding to the pre-set audio outputting channel from the audio source apparatus 200, the first audio outputting apparatus 10 may output audio corresponding to the audio outputting channel based on the re-configured profile information.

Meanwhile, in response to receiving the profile information representing the audio characteristics of the first audio outputting apparatus 10 from the first audio outputting apparatus 10 via the aforementioned operation S205, the second audio outputting apparatus 20 may set a multi channel for outputting multi channel audio along with the first audio outputting apparatus 10 based on the profile information re-configured based on the pre-stored profile information or reference profile information via operation S240 to operation S260.

As such, a method for the second audio outputting apparatus 20 to set a multi channel for outputting multi channel audio along with the first audio outputting apparatus 10 is the same as in operation S210 to operation S235 for the first audio outputting apparatus 10, and thus detailed explanation is omitted. That is, when the first and second audio outputting apparatus 10, 20 have different audio characteristics, by setting one of the profile information received independently and the pre-stored profile information as reference profile information, and re-configuring the pre-stored profile information based on the set reference profile information, the audio characteristics of the first and second audio outputting apparatus 10, 20 may be made to be similar to each other. Therefore, in the case of interlocking the first and second audio outputting apparatus 10, 20 having different audio characteristics and outputting multi channel audio, it is possible to resolve the inconvenience of having to make a setting related to audio outputting based on the audio characteristics of each of the first and second audio outputting apparatus 10, 20.

Figure 3:
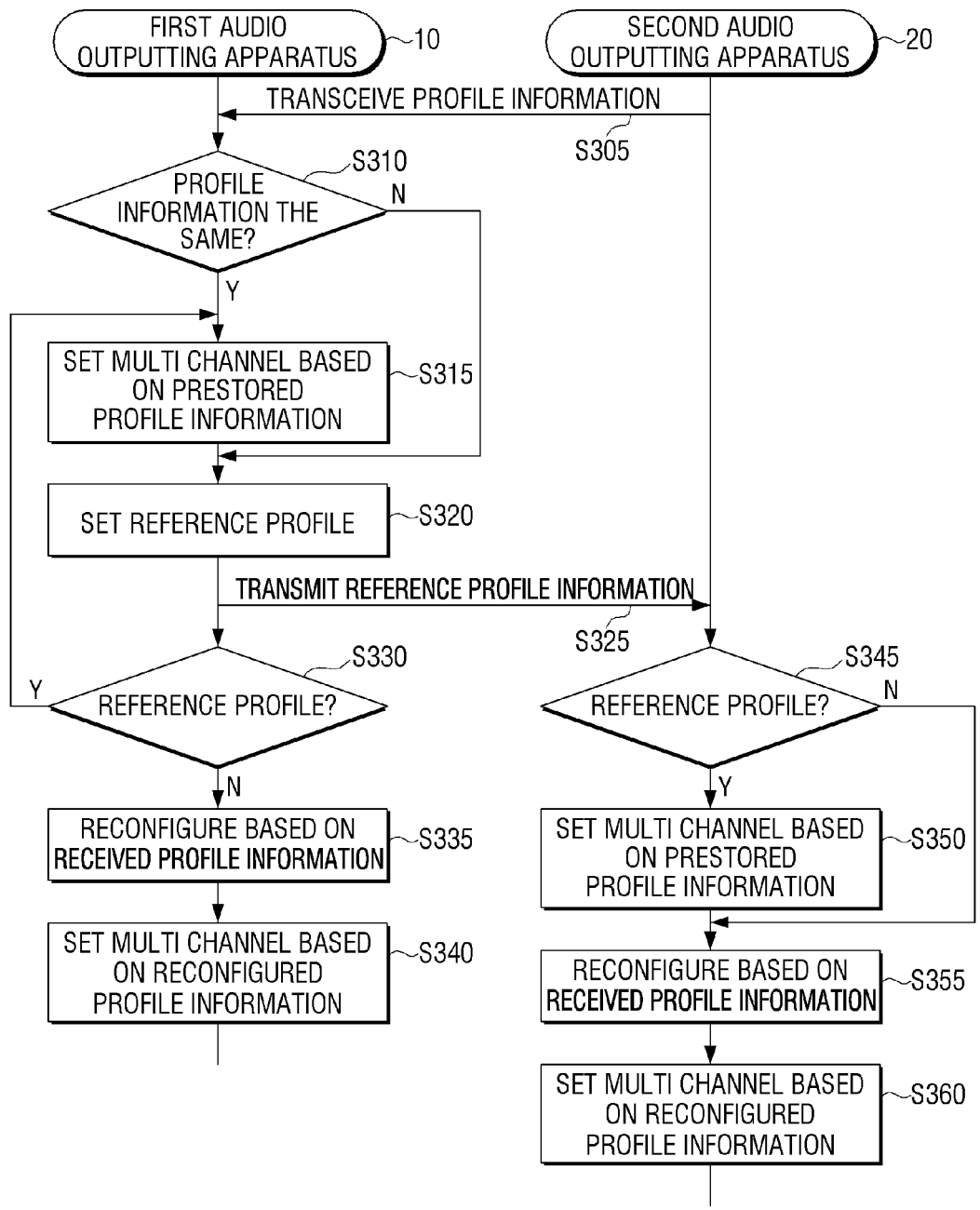
FIG. 3 is a second procedure view for outputting multi channel audio between a plurality of audio outputting apparatuses in an audio outputting system according to another exemplary embodiment.

FIG. 3 is a second procedure view for outputting multi channel audio between a plurality of audio outputting apparatuses in an audio outputting system according to another exemplary embodiment.

As illustrated in FIG. 3, the first and second audio outputting apparatus 10, 20 existing on a same network may be pre-set to an audio outputting channel corresponding to a user's channel setting command. Furthermore, one of the first and second audio outputting apparatus 10, 20 may be a master terminal apparatus according to a user's setting command. For example, in response to the first audio outputting apparatus 10 being set to a master terminal apparatus, the first audio outputting apparatus 10 may receive profile information representing the audio characteristics of the second audio outputting apparatus 20 from the second audio outputting apparatus 20 (S305). Herein, the profile information is information representing the audio characteristics of outputting audio of each of the first and second outputting apparatus 10, 20, and the profile information may include at least one of audio outputting information, frequency characteristics information, volume curve, and Sound Pressure Level (SPL) of each of the first and second audio outputting apparatus 10, 20.

In response to receiving the profile information representing the audio characteristics of the second audio outputting apparatus 20 from the second audio outputting apparatus 20, the first audio outputting apparatus 10 determines whether or not the received profile information is identical to the pre-stored profile information (S310). According to an exemplary embodiment, the first audio outputting apparatus 10 may determine whether or not the audio outputting information and sound pressure information included in the received profile information is identical to the audio outputting information and sound pressure information included in the pre-stored profile information.

In response to it being determined that the received profile information is identical to the pre-stored profile information, the first audio outputting apparatus 10 determines that it has the same audio outputting characteristics as the second audio outputting apparatus 20. As such, in response to it being determined that it has the same audio characteristics as the second audio outputting apparatus 20, the first audio outputting apparatus 10 sets a multi channel for outputting multi channel audio along with the second audio outputting apparatus 20 based on the pre-stored profile information (S315). Accordingly, in response to receiving an audio signal that has been signal-processed to a signal corresponding to the pre-set audio outputting channel from the audio source apparatus 200, the first audio outputting apparatus 10 may output audio corresponding to the corresponding audio outputting channel based on the pre-stored profile information.

Meanwhile, in response to it being determined that the received profile information is different from the pre-stored profile information, the first audio outputting apparatus 10 sets one of the received profile information and the pre-stored profile information as reference profile information based on pre-set conditions (S320) according to an exemplary embodiment, According to an exemplary embodiment, the first audio outputting apparatus 10 may compare audio outputting information or sound pressure information included in the received profile information with the audio outputting information or sound pressure information included in the pre-stored profile information, and set the profile information having a higher outputting intensity or higher sound pressure level as the reference profile information.

In response to the profile information of the first audio outputting apparatus 10 being set as the reference profile information through such a comparison, the first audio outputting apparatus 10 transmits the pre-set reference profile information to the second audio outputting apparatus 20 (S325). According to an exemplary embodiment, in response to the profile information of the first audio outputting apparatus 10 being set as the reference profile information, the first audio outputting apparatus 10 may transmit the reference profile information on the profile information of the first audio outputting apparatus 10 to the second audio outputting apparatus 20. Meanwhile, in response to the profile information of the second audio outputting apparatus 20 being set as the reference profile information, the first audio outputting apparatus 10 may transmit the reference profile information related to the profile information of the second audio outputting apparatus 20 to the second audio outputting apparatus 20.

Next, the first audio outputting apparatus 10 sets a multi channel for outputting multi channel audio along with the second audio outputting apparatus 20 based on the pre-set reference profile information. More specifically, in response to the pre-stored profile information being set as the reference profile information, the first audio outputting apparatus 10 sets a multi channel for outputting multi channel audio along with the second audio outputting apparatus 20 based on the pre-stored profile information (S330). Next, in response to receiving an audio signal that has been signal-processed to a signal corresponding to the pre-set audio outputting channel from the audio source apparatus 200, the first audio outputting apparatus 10 may output audio corresponding to the corresponding audio outputting channel based on the pre-stored profile information.

Meanwhile, in response to the received profile information of the second audio outputting apparatus 20 being set as the reference profile information, the first audio outputting apparatus 10 re-configures the pre-stored profile information of the first audio outputting apparatus 10 based on the received reference profile information (S335). That is, the first audio outputting apparatus 10 may re-configure the pre-stored profile information to profile information having audio characteristics similar to the audio characteristics of the second audio outputting apparatus 20 based on the reference profile information.

As such, in response to the pre-stored profile information being re-configured based on the reference profile information, the first audio outputting apparatus 10 sets a multi channel for outputting multi channel audio along with the second audio outputting apparatus 20 based on the re-configured profile information (S340). Next, in response to receiving an audio signal that has been signal-processed to a signal corresponding to the pre-set audio outputting channel from the audio source apparatus 200, the first audio outputting apparatus 10 may output audio corresponding to the corresponding audio outputting channel based on the re-configured profile information.

Meanwhile, in response to receiving the reference profile information from the first audio outputting apparatus 10 via operation S325, the second audio outputting apparatus 20 determines whether or not the received reference profile information is the pre-stored profile information of the second audio outputting apparatus 20 (S345). In response to it being determined that the profile information of the second audio outputting apparatus 20 is the reference profile information, the second audio outputting apparatus 20 sets a multi channel for outputting multi channel audio along with the first audio outputting apparatus 10 based on the pre-stored profile information (S350). Next, in response to receiving an audio signal that has been signal-processed to a signal corresponding to the pre-set audio outputting channel from the audio source apparatus 200, the second audio outputting apparatus 20 may output audio corresponding to the corresponding audio outputting channel based on the pre-stored profile information.

Meanwhile, in response to it being determined that the profile information of the first audio outputting apparatus 10 is not the reference profile information, the second audio outputting apparatus 20 re-configures the pre-stored profile information of the second audio outputting apparatus 20 based on the received reference profile information (S355). That is, the second audio outputting apparatus 20 may re-configure the pre-stored profile information to the profile information having the audio characteristics similar to the audio characteristics of the first audio outputting apparatus 10 based on the reference profile information.

As such, in response to the pre-stored profile information being re-configured based on the reference profile information, the second audio outputting apparatus 20 sets a multi channel for outputting multi channel audio along with the second audio outputting apparatus 20, based on the re-configured profile information (S360). Next, in response to receiving an audio signal that has been signal-processed into a signal corresponding to the pre-set audio outputting channel from the audio source apparatus 200, the second audio outputting apparatus 20 may output audio corresponding to the corresponding audio outputting channel based on the re-configured profile information.

Hereinabove was a detailed explanation of a method for outputting multi channel audio through a plurality of audio outputting apparatuses 100 in an audio outputting system according to exemplary embodiments of the present invention. Hereinbelow is a detailed explanation of each component of the aforementioned audio outputting apparatus 100.

Figure 4:
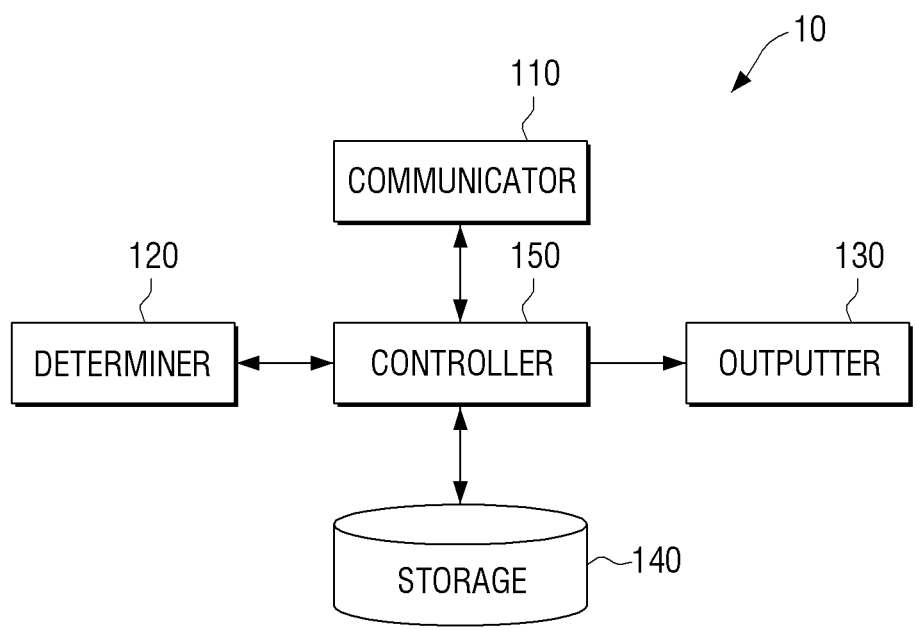
FIG. 4 is a block diagram of an audio outputting apparatus according to an exemplary embodiment.

FIG. 4 is a block diagram of an audio outputting apparatus according to an exemplary embodiment.

As illustrated in FIG. 4, the first audio outputting apparatus 10 includes a communicator 110, determiner 120, outputter 130, storage 140 and controller 150.

The communicator 110 performs communication with at least one other audio outputting apparatus (hereinafter referred to as "second audio outputting apparatus") existing on a same network of a plurality of audio outputting apparatuses, and receives profile information representing audio characteristics of the second audio outputting apparatus 20 from the second audio outputting apparatus 20. Furthermore, the communicator 110 performs communication with the second audio outputting apparatus 20 and transmits profile information representing audio characteristics of the audio outputting apparatus 10 pre-stored in the storage 140 to the second audio outputting apparatus 20. Further, the communicator 110 may receive a channel setting command for setting an audio outputting channel of the audio outputting apparatus 10 from a user terminal apparatus (not illustrated) or may receive an audio signal that has been signal-processed to a signal corresponding to the audio outputting channel of the audio outputting apparatus 10 from the audio source apparatus 200.

Such a communicator 110 may include various communication modules such as a short-distance wireless communication module (not illustrated), and wireless communication module (not illustrated). Herein, the short-distance wireless communication module is a module for performing communication with an external device such as the second outputting apparatus 20, audio source apparatus 200 and user terminal apparatus (not illustrated) located nearby via a short-distance wireless communication method such as a bluetooth and Zigbee method and so forth. Furthermore, the wireless communication module is a module for performing communication with an external network according to a wireless communication protocol such as WiFi and IEEE and so forth. Besides the aforementioned, the wireless communication module may further include mobile communication modules that perform communication by accessing a mobile communication network according to various communication standards such as 3rd Generation (3G), 3rd Generation Partnership Project (3GPP), and Long Term Evolution (LTE).

In response to receiving profile information representing audio characteristics from the second audio outputting apparatus 20 through the communicator 110, the determiner 120 determines whether or not the received profile information is the same as the profile information of the audio outputting apparatus 10 pre-stored in the storage 140. Furthermore, the outputter 130 outputs an audio that has been signal-processed to a signal corresponding to the audio outputting channel of the first audio outputting apparatus 10 from the audio source apparatus 200. Furthermore, as aforementioned, the storage 140 stores the profile information representing the audio characteristics of the first audio outputting apparatus 10. Herein, the profile information may include at least one of the audio outputting information, frequency characteristics information, volume curve, and Sound Pressure Level (SPL) of the audio outputting apparatus 10. The storage 140 that stores such profile information of the audio outputting apparatus 10 may further store channel information on the audio outputting channel set according to the user's channel setting command.

Such a storage 140 is a storage medium that stores various programs necessary for operating the audio outputting apparatus 10, and the storage 140 may be embodied as a memory or Hard Disk Drive (HDD) and so forth. For example, the storage 140 may be provided with a ROM for storing programs for operating a controller 150 that will be explained hereinbelow and a RAM for temporarily storing data according to operating the controller 150. Furthermore, the storage 150 may further include an Electrically Erasable and Programmable ROM (EEROM) for storing various reference data.

Before interlocking with the second audio outputting apparatus 20 and outputting multi channel audio, the controller 150, in response to receiving a channel setting command from the user terminal apparatus (not illustrated) through the communicator 110, sets an audio outputting channel based on the received channel setting command as aforementioned. As such, with the audio outputting channel set, the controller 150 controls the determiner 120 to determine whether or not the profile information received from the second audio outputting apparatus 20 is identical to the profile information of the first audio outputting apparatus 10 stored in the storage 140. According to such a control command, the determiner 120 determines whether or not the profile information received from the second audio outputting apparatus 20 is identical to the profile information of the first audio outputting apparatus 10 pre-stored in the storage 140. According to an exemplary embodiment, the determiner 120 may determine whether or not the audio outputting information and sound pressure information of various information included in the received profile information is identical to the audio outputting information and sound pressure information included in the pre-stored profile information.

In response to it being determined that the received profile information is identical to the pre-stored profile information through such a determination, the controller 150 determines that the second audio outputting apparatus 20 has the same audio characteristics as the first audio outputting apparatus 10. As such, in response to it being determined that the first audio outputting apparatus 10 has the same audio characteristics as the second audio outputting apparatus 20, the controller 150 sets a multi channel for outputting multi channel audio along with the second audio outputting apparatus 20 based on the pre-stored profile information. Next, in response to an audio signal that has been signal-processed corresponding to the pre-set audio outputting channel being received from the audio source apparatus 200 through the communicator 110, the controller 150 controls the outputter 130 to output the corresponding audio signal based on the pre-stored profile information. Accordingly, the outputter 130 may output the audio signal received from the audio source apparatus 200 in an audible sound format based on the pre-stored profile information.

Meanwhile, in response to it being determined that the received profile information is different from the pre-stored profile information, the controller 150 re-configures the pre-stored profile information based on the received profile information according to pre-set conditions. More specifically, in response to the received profile information being different from the pre-stored profile information, the controller 150 compares the received profile information and the pre-stored profile information. That is, the controller 150 compares the audio set value included in the received profile information with the audio set value included in the pre-stored profile information. In response to the audio set value included in the received profile information being greater than the audio set value included in the pre-stored profile information as a result of comparison, the controller 150 re-configures the pre-stored profile information based on the received profile information.

Herein, the audio set value included in the pre-stored profile information and the received profile information may be audio outputting information or sound pressure information of the first audio outputting apparatus 10 and the second audio outputting apparatus 20.

Therefore, the controller 150 may compare the audio outputting information included in the received profile information and the audio outputting information included in the pre-stored profile information, and set the profile information having a greater output intensity as the reference profile information. Not only that, the controller 150 may compare the sound pressure information included in the received profile information and the sound pressure information included in the pre-stored profile information and set the profile information having a greater sound pressure level as the reference profile information.

In response to the pre-stored profile information being set as the reference profile information through such pre-set conditions, the controller 150 sets a multi channel for outputting multi channel audio along with the second audio outputting apparatus 20 based on the pre-stored profile information. Next, in response to an audio signal that has been signal-processed corresponding to the pre-set audio outputting channel being received from the audio source apparatus 200 through the communicator 110, the controller 150 controls the outputter 130 to output the corresponding audio signal based on the pre-stored profile information. Accordingly, the outputter 130 may output the audio signal received from the audio source apparatus 200 in a sound audible format based on the pre-stored profile information.

Meanwhile, in response to the received profile information being set as the reference profile information, the controller 150 modifies a volume curve included in the pre-stored profile information of the first audio outputting apparatus 10 based on the audio outputting information included in the reference profile information. Herein, the audio outputting information may include an audio outputting power per volume level.

According to an exemplary embodiment, in response to the profile information received from the second audio outputting apparatus 20 being set as the reference profile information, the controller 150 determines a volume level corresponding to a maximum volume level included in the audio outputting information of the pre-stored profile information among the volume levels included in the audio outputting information of the received profile information. In response to a volume level corresponding to a maximum volume level included in the audio outputting information of the pre-stored profile information being determined from the audio outputting information of the received profile information, the controller 150 may adjust the audio outputting power of the maximum volume level included in the audio outputting information of the pre-stored profile information based on the audio outputting power of the pre-determined volume level, and modify the volume curve of the first audio outputting apparatus 10.

Figure 5:
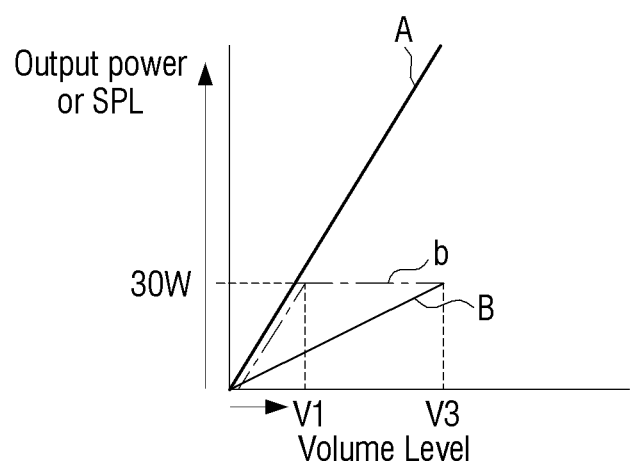
FIG. 5 is an exemplary view of modifying a volume curve of an audio outputting apparatus based on reference profile information in an audio outputting apparatus according to an exemplary embodiment.

FIG. 5 is an exemplary view of modifying a volume curve of an audio outputting apparatus based on reference profile information in an audio outputting apparatus according to an exemplary embodiment.

As illustrated in FIG. 5, a volume curve B of the first audio outputting apparatus 10 may be generated based on the audio outputting power per volume level included in the audio outputting information of the pre-stored profile information. Furthermore, a volume curve A of the second audio outputting apparatus 20 may be generated based on an audio outputting power per volume level included in the audio outputting information of the profile information (reference profile information) received from the second audio outputting apparatus 20.

Herein, referring to the volume curve B, it can be seen that the volume level corresponding to V3 is the maximum volume level, and that at the maximum volume level V3, the audio outputting power is 30 W. Meanwhile, looking at the volume curve A, it can be seen that the volume level related to the audio outputting power at the maximum volume level of the volume curve B is V1. In this case, the controller 150 modifies the volume curve A of the first audio outputting apparatus 10 such that the audio outputting power is 30 W at the volume level corresponding to V1 as in volume curve b. Accordingly, the first audio outputting apparatus 10 may expand the audio output from the volume level corresponding to V1 to 30 W of audio outputting power as in volume curve A of the second audio outputting apparatus 20.

As such, in response to the volume curve of the first audio outputting apparatus 10 being modified based on the profile information of the second audio outputting apparatus 20 set as the reference profile information, the controller 150 may use a pre-defined output expanding algorithm to expand the audio outputting power of the first audio outputting apparatus 10 to the audio outputting power included in the audio outputting information of the reference profile information and re-adjust the pre-modified volume curve/line. Herein, the output expanding algorithm is an algorithm for expanding an audio outputting power of the audio outputting apparatus 200, and such an output expanding algorithm is a known art and is thus omitted herein.

Figure 6:
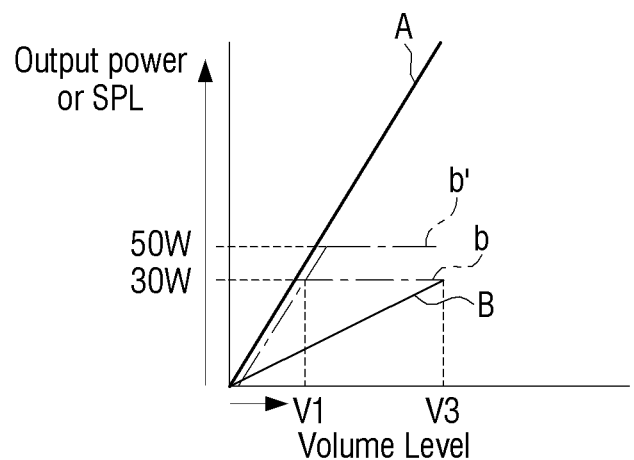
FIG. 6 is an exemplary view of re-adjusting a pre-modified volume curve based on reference profile information in an audio outputting apparatus according to an exemplary embodiment.

FIG. 6 is an exemplary view of re-adjusting a pre-modified volume curve/line based on the reference profile information in the audio outputting apparatus according to an exemplary embodiment.

As aforementioned, the volume curve/line B may be a graph generated based on the audio outputting power per volume level included in the audio outputting information of the profile information pre-stored in the first audio outputting apparatus 10. Furthermore, the volume curve/line A may be a graph generated based on the audio outputting power per volume level included in the audio outputting information of the profile information (reference profile information) received from the second audio outputting apparatus 20. Furthermore, the volume curve/line B may be a graph generated based on a volume level corresponding to an audio outputting power of the volume levels related to the maximum volume level of the volume curve/line B and the volume level of volume curve/line A. That is, the volume curve/line b is a graph where the volume curve/line B of the first audio outputting apparatus 10 has been modified based on the audio outputting information included in the reference profile information and the audio outputting information included in the pre-stored profile information.

As such, in response to the volume curve/line B of the first audio outputting apparatus 10 being modified to volume curve/line b, the controller 150 uses a pre-defined output expanding algorithm to expand the audio outputting power of the first audio outputting apparatus 10 to the audio outputting power included in the audio outputting information of the reference profile information and re-adjust the pre-modified volume curve/line b. Accordingly, the pre-modified volume curve/line b of the first audio outputting apparatus 10 may be re-adjusted to the volume curve/line b' of which the audio outputting power has been expanded.

Meanwhile, in response to re-adjustment to the volume curve/line b' of which the audio outputting power has been expanded, the first audio outputting apparatus 10 may not output audio for a specific frequency area among the frequency areas for which audio may be reproduced. For example, the first audio outputting apparatus 10 may have a maximum audio outputting power of 30 W, and may be capable of reproducing audio in a frequency area of 50 Hz~20 KHz. However, in response to the audio outputting power being expanded from 30 W to 50 W as in volume curve/line b' of FIG. 6, the first audio outputting apparatus 10 may not output audio for a certain frequency area (low band frequency area) of the frequency areas of 50 Hz~20 KHz.

As such, in response to it being impossible to output audio for a certain frequency area based on the frequency characteristics information included in the pre-stored profile information and the re-adjusted volume curve, the controller 150 transmits the frequency information related to the specific frequency area for which outputting audio is impossible, to the second audio outputting apparatus 20 through the communicator 110. Herein, the second audio outputting apparatus 20 may be an outputting apparatus that is capable of outputting audio for the specific frequency area. Accordingly, the second audio outputting apparatus 20 may output audio for the specific frequency area based on the frequency information received from the first audio outputting apparatus 10.

Hereinabove, each component of the first audio outputting apparatus 10 according to an exemplary embodiment was explained in detail. Herein below is detailed explanation on a method for outputting multi channel audio in an interlocked manner with at least one other audio outputting apparatus in a first audio outputting apparatus 10 according to an exemplary embodiment.

Figure 7:
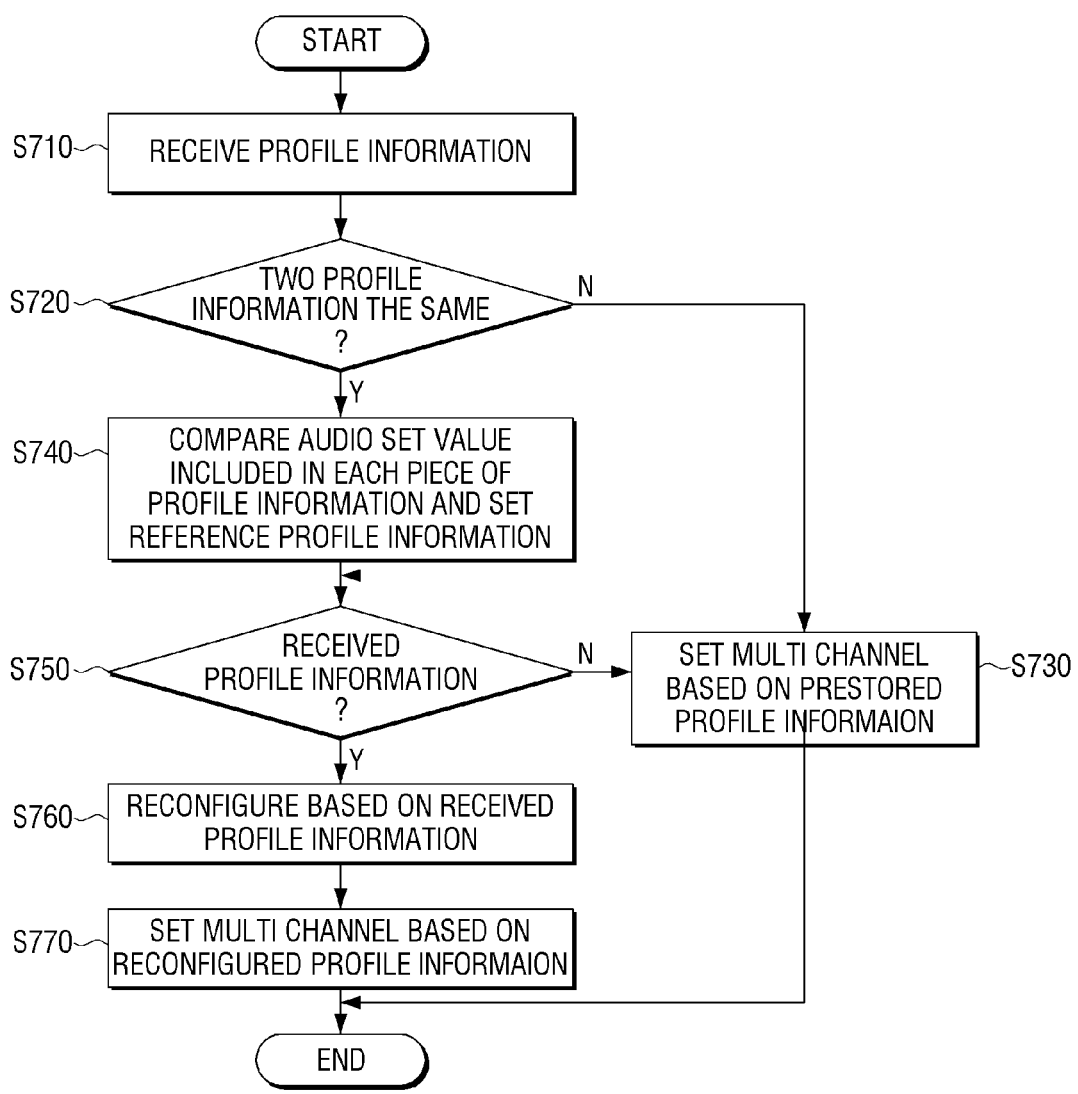
FIG. 7 is a flowchart of a controlling method of an audio outputting apparatus according to an exemplary embodiment.

FIG. 7 is a flowchart of a controlling method of an audio outputting apparatus according to an exemplary embodiment.

As illustrated in FIG. 7, before outputting multi channel audio in an interlocked manner with at least one other audio outputting apparatus (hereinbelow referred to as a second audio outputting apparatus) existing on a same network, the first audio outputting apparatus 10 sets an audio outputting channel according to a channel setting command received through a user terminal apparatus (not illustrated). As such, with the audio outputting channel set, the first audio outputting apparatus 10 receives profile information representing audio characteristics of the second audio outputting apparatus 20 from the second audio outputting apparatus 20 (S710).

In response to receiving the profile information from the second audio outputting apparatus 20, the first audio outputting apparatus 10 determines whether or not the received profile information is identical to the pre-stored profile information (S720). Herein, the pre-stored profile information and the received profile information may include at least one of audio outputting information, frequency characteristics information, volume curve and sound pressure information of the first audio outputting apparatus 10 and second audio outputting apparatus 20. Therefore, the first audio outputting apparatus 10 may determine whether or not audio outputting information and sound pressure information of various information included in the received profile information is identical to audio outputting information and sound pressure information included in the pre-stored profile information.

In response to it being determined that the received profile information is identical to the pre-stored profile information, the first audio outputting apparatus 10 determines that the second audio outputting apparatus 20 has the same audio outputting characteristics as the first audio outputting apparatus 10. As such, in response to it being determined that the first audio outputting apparatus 10 has the same audio characteristics as the second audio outputting apparatus 20, the first audio outputting apparatus 10 sets a multi channel for outputting multi channel audio along with the second audio outputting apparatus 20 based on the pre-stored profile information (S730). Next, in response to receiving an audio signal that has been signal-processed to a signal corresponding to a pre-set audio outputting channel from the audio source apparatus 200, the first audio outputting apparatus 10 may output the corresponding audio signal based on the pre-stored profile information.

Meanwhile, in response to it being determined that the received profile information is different from the pre-stored profile information, the first audio outputting apparatus 10 compares an audio set value included in the pre-stored profile information with an audio set value included in the received profile information, and sets a reference profile information (S740). Next, the first audio outputting apparatus 10 determines whether or not the pre-set reference profile information is the received profile information or the pre-stored profile information (S750). More specifically, in response to the audio set value included in the received profile information being greater than the audio set value included in the pre-stored profile information, the first audio outputting apparatus 10 sets the received profile information as the reference profile information. On the contrary, in response to the audio set value included in the pre-stored profile information being greater than the audio set value included in the received profile information, the first audio outputting apparatus 10 may set the pre-stored profile information as the reference profile information.

In response to the pre-stored profile information being set as the reference profile information through such a comparison, the first audio outputting apparatus 10 may set a multi channel for outputting multi channel audio along with the second audio outputting apparatus 20 based on the pre-stored profile information as in the aforementioned operation S730. Meanwhile, in response to the received profile information being set as the reference profile information, the first audio outputting apparatus 10 may re-configure the pre-stored profile information based on the received profile information according to pre-set conditions (S760).

Herein below is detailed explanation on a method for re-configuring the pre-stored profile information based on the reference profile information in the first audio outputting apparatus 10 referring to FIG. 8.

Figure 8:
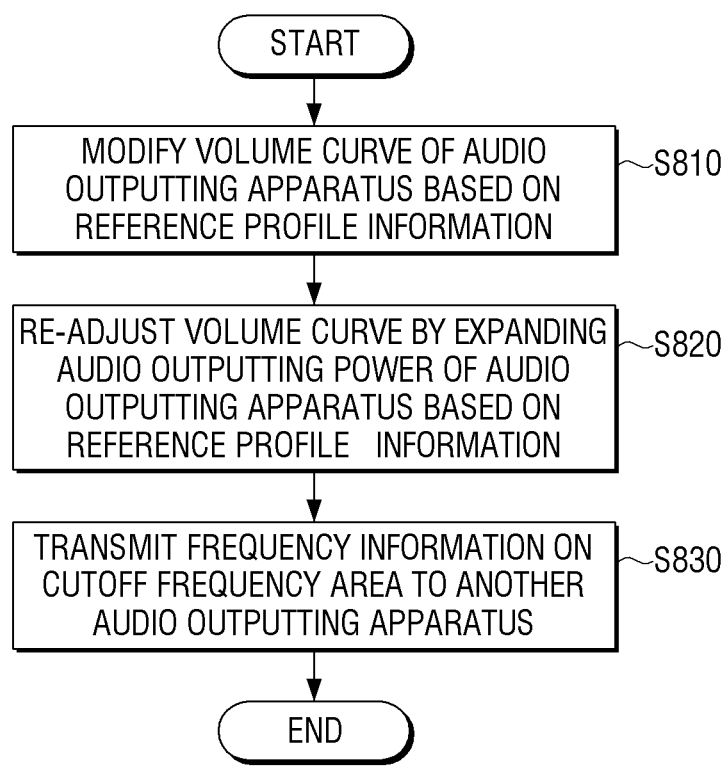
FIG. 8 is a flowchart of a method for re-configuring pre-stored profile information in an audio outputting apparatus according to an exemplary embodiment.

FIG. 8 is a flowchart of a method for re-configuring pre-stored profile information in an audio outputting apparatus according to an exemplary embodiment.

As illustrated in FIG. 8, in response to the profile information received from the second audio outputting apparatus 20 being set as the reference profile information, the first audio outputting apparatus 10 modifies the volume curve included in the pre-stored profile information related to the first audio outputting apparatus 10 based on the audio outputting information included in the received profile information (reference profile information) (S810). Herein, the audio outputting information may include audio outputting power per volume level.

According to an exemplary embodiment, the first audio outputting apparatus 10 determines a volume level corresponding to a maximum volume level included in the audio outputting information of the pre-stored profile information, among the volume levels included in the audio outputting information of the received profile information. Next, the first audio outputting apparatus 10 may modify the volume curve of the audio outputting information of the pre-stored profile information based on the audio outputting power of the pre-determined volume level.

As such, in response to the volume curve of the first audio outputting apparatus 10 being modified based on the profile information of the second audio outputting apparatus 20 set as the reference profile information, the first audio outputting apparatus 10 uses a pre-defined output expanding algorithm to expand the audio outputting power of the first audio outputting apparatus 10 to the audio outputting power included in the audio outputting information of the reference profile information and re-adjust the pre-modified volume curve (S820).

Meanwhile, in response to the audio outputting power being re-adjusted to the expanded volume curve, the first audio outputting apparatus 10 may not output audio for a certain frequency area among the frequency areas for which audio may be reproduced. As such, in response to it being impossible to output audio regarding a specific frequency area based on the frequency characteristics information included in the pre-stored profile information and the re-adjusted volume curve, the first audio outputting apparatus 10 transmits the frequency information of the specific frequency area for which it is impossible to output audio to the second audio outputting apparatus 20. That is, the first audio outputting apparatus 10 cuts off the specific frequency area for which it is impossible to output audio of the frequency areas for which it is possible to output audio, and transmits the frequency information related to the specific frequency area that has been cut off to the second audio outputting apparatus 20. Herein, the second audio outputting apparatus 20 may be an outputting apparatus capable of outputting audio of the specific frequency area. Accordingly, the second audio outputting apparatus 20 may output audio related to the specific frequency area based on the frequency information received from the first audio outputting apparatus 10.

In response to the pre-stored profile information being re-configured based on the profile information of the second audio outputting apparatus 20 set to the reference profile information through the aforementioned processes, the first audio outputting apparatus 10 sets a multi channel for outputting multi channel audio along with the second audio outputting apparatus 20, based on the re-configured profile information. Next, in response to the audio signal that has been signal-processed to a signal corresponding to the pre-set audio outputting channel being received from the audio source apparatus 200, the first audio outputting apparatus 10 may output the audio signal in an audible sound format based on the re-configured profile information.

Although a few exemplary embodiments have been shown and described, it would be appreciated by those skilled in the art that changes may be made in the exemplary embodiments without departing from the principles and spirit of the invention, the scope of which is defined in the claims and their equivalents.

What is claimed is:

1. A controlling method of an audio outputting apparatus that outputs multi channel audio with at least one other audio outputting apparatus, the method comprising:
   receiving profile information representing audio characteristics from the at least one other audio outputting apparatus;
   determining whether or not the received profile information is a same as pre-stored profile information of the audio outputting apparatus; and
   in response to an audio setting value included in the pre-stored profile information being different from an audio setting value included in the received profile information, updating the pre-stored profile information based on the received profile information.

2. The method according to claim 1, wherein the audio outputting apparatus exists on a same network as the at least one other audio outputting apparatus, and transmits the pre-stored profile information to the at least one other audio outputting apparatus existing on the same network.

3. The method according to claim 1, wherein the re-configuring, in response to the received profile information being different from the pre-stored profile information, includes comparing the received profile information with the pre-stored profile information, and in response to an audio set value included in the received profile information being greater than an audio set value included in the pre-stored profile information, re-configuring the pre-stored profile information based on the received profile information.

4. The method according to claim 1, wherein the profile information comprises at least one from among audio outputting information, frequency characteristics information, volume curve, and Sound Pressure Level (SPL) information of.

5. The method according to claim 4, wherein the re-configuring comprises, in response to the received profile information being set as a reference profile information, modifying a volume curve included in the profile information of the audio outputting apparatus based on audio outputting information included in the reference profile information.

6. The method according to claim 5, wherein the audio outputting information comprises an audio outputting power per volume level, and the modifying comprises adjusting an audio outputting power of a maximum volume level based on an audio outputting power of a volume level corresponding to the maximum volume level included in audio outputting information of the audio outputting apparatus among volume levels included in audio outputting information of the reference profile information, and modifies the volume curve.

7. The method according to claim 5, wherein the re-configuring further comprises expanding an audio outputting power of the audio outputting apparatus to an audio outputting power included in the audio outputting information of the reference profile information using a pre-defined output expanding algorithm so as to re-adjust the modified volume curve.

8. The method according to claim 7, further comprising, in response to it being impossible to output audio related to a specific frequency area based on frequency characteristics information included in profile information of the audio outputting apparatus and the re-adjusted volume curve, transmitting frequency information on the specific frequency area to another audio outputting apparatus that is capable of outputting audio of the specific frequency area.

9. The method according to claim 1, further comprising, in response to receiving a user's channel setting command from a user terminal apparatus, setting an audio outputting channel according the channel setting command.

10. An audio outputting apparatus that outputs multi channel audio with at least one other audio outputting apparatus, the apparatus comprising: a communicator configured to perform communication with the at least one other audio outputting apparatus; a determiner configured to determine whether or not the received profile information is a same as pre-stored profile information related to the audio outputting apparatus in response to receiving profile information representing audio characteristics from the at least one other audio outputting apparatus; and a controller configured to update the pre-stored profile information based on the received profile information, in response to an audio setting value included in the pre-stored profile information being different from an audio setting value included in the received profile information.

11. The apparatus according to claim 10, wherein the communicator transmits the pre-stored profile information to the at least one other audio outputting apparatus existing on a same network as the audio outputting apparatus.

12. The apparatus according to claim 10, wherein the controller, in response to the received profile information being different from the pre-stored profile information, compares the received profile information with the pre-stored profile information, and in response to an audio set value included in the received profile information being greater than an audio set value included in the pre-stored profile information, re-configures the pre-stored profile information based on the received profile information.

13. The apparatus according to claim 10, further comprising a storage that stores the pre-stored profile information, wherein the pre-stored profile information comprises at least one from among audio outputting information, frequency characteristics information, volume curve, and Sound Pressure Level (SPL) information.

14. The apparatus according to claim 13, wherein the controller, in response to the received profile information being set as a reference profile information, modifies a volume curve included in the pre-stored profile information of the audio outputting apparatus based on audio outputting information included in the reference profile information.

15. The apparatus according to claim 14, wherein the audio outputting information comprises an audio outputting power per volume level, and the controller adjusts an audio outputting power related to a maximum volume level based on an audio outputting power related to a volume level corresponding to the maximum volume level included in audio outputting information related to the audio outputting apparatus, the volume level being from among volume levels included in audio outputting information of the reference profile information, and modifies the volume curve.

16. The apparatus according to claim 14, wherein the controller expands an audio outputting power of the audio outputting apparatus to an audio outputting power included in audio outputting information related to the reference profile information using a pre-defined output expanding algorithm so as to re-adjust the modified volume curve.

17. The apparatus according to claim 16, wherein the controller, in response to it being impossible to output audio related to a specific frequency area based on frequency characteristics information included in the pre-stored profile information of the audio outputting apparatus and the re-adjusted volume curve, controls the communicator to transmit frequency information on the specific frequency area to another audio outputting apparatus that is capable of outputting audio related to the specific frequency area.

18. The apparatus according to claim 10, wherein the controller, in response to receiving a user's channel setting command from a user terminal apparatus through the communicator, sets an audio outputting channel according to the channel setting command.

19. An audio outputting system that outputs multi channel audio through a plurality of audio outputting apparatuses, the audio outputting system comprising:

a first audio outputting apparatus configured to transmit pre-stored profile information to a second audio outputting apparatus from among the plurality of audio outputting apparatuses; and a second audio outputting apparatus configured to, in response to receiving profile information from the first audio outputting apparatus, compare an audio setting value included in the received profile information and an audio setting value included in pre-stored profile information, and in response to the audio setting value included in the pre-stored profile information and the audio setting value included in the received profile information being different, update the pre-stored profile information based on the received profile information according to whether profile information corresponding to a predetermined condition from among the pre-stored profile information and the received profile information is a same as the received profile information.

20. The system according to claim 19, wherein the second audio outputting apparatus, in response to the profile information corresponding to the pre-set conditions being the received profile information, sets the received profile information as a reference profile information, and modifies a volume curve included in the pre-stored profile information based on audio outputting information included in the reference profile information.

21. The system according to claim 20, wherein the second audio outputting apparatus expands an audio outputting power included in audio outputting information of the pre-stored profile information to an audio outputting power included in audio outputting information of the reference profile information using a pre-defined output expanding algorithm so as to re-adjust the modified volume curve.

* * * * *